United States Patent
Mouisse et al.

(10) Patent No.: US 10,808,640 B2
(45) Date of Patent: Oct. 20, 2020

(54) METHOD FOR DETECTING MALFUNCTION OF A SOFTWARE SOLUTION FOR ESTIMATING THE INSTANT OF INTERRUPTION OF FUEL INJECTION OF AN INTERNAL COMBUSTION ENGINE

(71) Applicants: Continental Automotive France, Toulouse (FR); Continental Automotive GmbH, Hannover (DE)

(72) Inventors: Henri Mouisse, Toulouse (FR); Davy Bonnassies, Soues (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/097,672

(22) PCT Filed: May 30, 2017

(86) PCT No.: PCT/FR2017/051346
§ 371 (c)(1),
(2) Date: Oct. 30, 2018

(87) PCT Pub. No.: WO2017/207916
PCT Pub. Date: Dec. 7, 2017

(65) Prior Publication Data
US 2019/0162129 A1 May 30, 2019

(30) Foreign Application Priority Data
May 31, 2016 (FR) ...................................... 16 54909

(51) Int. Cl.
*F02D 41/22* (2006.01)
*H04Q 9/00* (2006.01)
(Continued)

(52) U.S. Cl.
CPC ....... *F02D 41/221* (2013.01); *F02D 41/2467* (2013.01); *F02M 65/001* (2013.01);
(Continued)

(58) Field of Classification Search
CPC .... F02D 41/221; F02D 41/2467; F02D 41/20; F02D 2200/063; F02D 2200/0625;
(Continued)

(56) References Cited

U.S. PATENT DOCUMENTS 9,689,908 B2 * 6/2017 Ascher ................ F02D 41/2096
2012/0325936 A1 12/2012 Rodriguez-Amaya et al.
(Continued)

FOREIGN PATENT DOCUMENTS

DE          10024662 A1    12/2001
DE     102005032087 A1     1/2007
(Continued)

OTHER PUBLICATIONS

International Search Report and Written Opinion for International Application No. PCT/FR2017/051346, dated Aug. 17, 2017, 8 pages.

*Primary Examiner* — Xiao En Mo
(74) *Attorney, Agent, or Firm* — RatnerPrestia

(57) ABSTRACT

A method for detecting the malfunction of a software solution configured to generate data representing the instant of interruption of fuel injection of an internal combustion engine. The method comprises acquiring data by a data acquisition device which is connected to a measurement device fixed to an injector body and configured to emit data representing closure instants of an injection nozzle, recording the data generated by the software solution and the data emitted by the measurement device, over a predetermined duration, synchronizing the data generated by the software solution and the data emitted by the measurement device, (Continued)

and comparing the data generated by the software solution and the data emitted by the measurement device, the software solution being considered to be malfunctioning when they do not satisfy predefined criteria.

18 Claims, 3 Drawing Sheets

(51) Int. Cl.
    *F02D 41/24* (2006.01)
    *F02M 65/00* (2006.01)
    *F02D 41/20* (2006.01)

(52) U.S. Cl.
    CPC ........ *F02M 65/003* (2013.01); *F02M 65/005* (2013.01); *H04Q 9/00* (2013.01); *F02D 41/20* (2013.01); *F02D 2200/063* (2013.01); *F02D 2200/0614* (2013.01); *F02D 2200/0616* (2013.01); *F02D 2200/0618* (2013.01); *F02D 2200/0625* (2013.01); *H04Q 2209/845* (2013.01)

(58) Field of Classification Search
    CPC ..... F02D 2200/0618; F02D 2200/0616; F02D 2200/0614; F02M 65/003; F02M 65/001; F02M 65/005; H04Q 9/00; H04Q 2209/845

See application file for complete search history.

(56) References Cited

U.S. PATENT DOCUMENTS

| | | |
|---|---|---|
| 2013/0240639 A1 | 9/2013 | Rapp et al. |
| 2016/0077141 A1 | 3/2016 | Ascher et al. |

FOREIGN PATENT DOCUMENTS

| | | |
|---|---|---|
| DE | 102006003861 A1 | 8/2007 |
| DE | 102010044012 A1 | 5/2012 |
| DE | 102011078915 A1 | 1/2013 |
| DE | 102012222851 A1 | 6/2014 |
| DE | 102013208528 A1 | 8/2014 |
| DE | 102014209326 A1 | 11/2015 |
| EP | 1887205 A1 | 2/2008 |
| EP | 2455600 A1 | 5/2012 |
| EP | 2455601 A1 | 5/2012 |
| FR | 3022589 A1 | 12/2015 |

\* cited by examiner

METHOD FOR DETECTING MALFUNCTION OF A SOFTWARE SOLUTION FOR ESTIMATING THE INSTANT OF INTERRUPTION OF FUEL INJECTION OF AN INTERNAL COMBUSTION ENGINE

CROSS REFERENCE TO RELATED APPLICATIONS

This application is the U.S. National Phase Application of PCT International Application No. PCT/FR2017/051346, filed May 30, 2017, which claims priority to French Patent Application No. 1654909, filed May 31, 2016, the contents of such applications being incorporated by reference herein.

FIELD OF THE INVENTION

The invention belongs to the field of fuel injection in an internal combustion engine installed in a vehicle, and it relates more particularly to a method for detecting malfunction of a software solution for estimating the instant of interruption of fuel injection of an internal combustion engine.

BACKGROUND OF THE INVENTION

Among known devices for injecting fuel into a combustion chamber of an internal combustion chamber, there are indirectly controlled injectors, for example using an actuator of the hydroelectric servovalve type. These injectors generally comprise a substantially cylindrical injector body, through which a main injection channel intended to contain a fuel at high pressure, typically about two thousand bar, extends axially from a fuel inlet end to one or more injection holes formed in a sealing seat of a nozzle of a body of the injector. The injection nozzle is configured in order to be closed in a leaktight fashion by a first end of a needle arranged so as to move in translation in the body of the injector. A control channel connected to the main channel is arranged at a second end of the needle, so that by application of a force to said second end of the needle the fuel at high pressure is capable of holding the needle against the sealing seat, thus closing the injection nozzle. A hydroelectric servovalve comprising a piezoelectric actuator is configured in the control chamber so as to be able to generate a fuel leakage flow to a bypass channel, which makes the pressure decrease locally on the second end of the needle. The effect of this local decrease in pressure is to displace the needle by a phenomenon of equilibration of the pressures applied to the needle, thus opening the injection nozzle by releasing the first end of the needle from the sealing seat and causing injection of fuel into a combustion chamber of an internal combustion engine.

The actuation of the hydroelectric servovalve is carried out, in a manner known to the person skilled in the art, by an electrical pulse at the instruction of a monitoring and control means of the engine, commonly referred to as an "engine control unit" (ECU), on the basis of a fuel injection strategy. The injection strategy determines, in particular, the instants at which the ECU sends the instructions to open and close the injection nozzle.

It is important to be able to determine the precise instant at which the injection starts after the electrical pulse for actuating the servovalve is sent, that is to say the precise instant at which the needle releases the injection nozzle so that fuel can actually be injected into the combustion chamber. It is equally important to be able to determine the precise instant at which injection stops once the pulse has ended, that is to say precise instant at which the needle closes the nozzle. Knowledge of these instants makes it possible to establish a precise injection strategy, in particular as a function of the position of the piston in the combustion chamber.

Software solutions integrated into the ECU make it possible to estimate the delays between the instant when the instructions are sent and the instant when the injection starts, as well as the instant when the injection is interrupted. As an informative example, the delay between the instant when the instructions are sent and the start of injection is determined by taking into account various parameters, such as the delay in displacement of the servovalve, the delay in displacement of the hydraulic flow or the displacement inertia of the needle.

The delay between the instant of the end of the instruction and the closure of the injection nozzle depends on several parameters, such as the rotational speed of the crankshaft of the engine, and may vary in the course of time. Despite all or some of these parameters being taken into account, the data estimated by the software solutions may be interfered with by various environmental parameters, engine settings, etc.

If the data estimated by the software solutions are not true to reality, it is possible that the injection strategy established by the ECU will generate an increase in the injection time, which may give rise to degradation of the performance of the internal combustion engine. This is why it is crucial to be able to verify the stability of these software solutions, that is to say the reliability of their estimates in relation to real delays in the course of time.

Furthermore, the stability of these software solutions is crucial for the definition of a precise quantity of fuel, for example over a predefined time interval.

SUMMARY OF THE INVENTION

An aspect of the invention is a method for monitoring malfunction of a software solution in order to be able to determine its robustness, that is to say the stability of the performance of said software solution in the course of time and in response to environmental parameters.

An aspect of the present invention aims to overcome the aforementioned drawbacks by providing a method for detecting malfunction of a software solution of a means for monitoring and controlling an internal combustion engine, this solution being configured to generate data representing the instant of interruption of fuel injection, said monitoring and control means being electrically connected to a hydroelectric servovalve of an injector of said internal combustion engine, said method comprising steps of:
  acquiring data by data acquisition means which are connected to measurement means fixed to an injector body and configured to emit data representing closure instants of an injection nozzle,
  recording the data generated by the software solution and the data emitted by the measurement means, over a predetermined duration,
  synchronizing the data generated by the software solution and the data emitted by the measurement means,
  comparing the data generated by the software solution and the data emitted by the measurement means, so as to identify possible discrepancies between these data, the software solution being considered to be malfunctioning when the discrepancies between the compared data do not satisfy predefined criteria.

The robustness of the software solution can thus be determined.

In particular embodiments, an aspect of the invention furthermore satisfies the following characteristics, implemented separately or in any of their technically feasible combinations.

In particular embodiments, one of the predefined criteria is that the value of the range of the values of the discrepancies of the compared data must be less than a threshold value.

The term "range" is intended to mean the difference between the maximum value and the minimum value of the discrepancies of the data compared.

In particular embodiments of an aspect of the invention, a step preliminary to the step of acquiring the data is a step of installing measurement means on the body of the injector.

In particular embodiments of an aspect of the invention, a step of windowing the data emitted by the measurement means, in order to isolate the instants of closure of the injection nozzle, is carried out between the steps of synchronization and comparison.

This windowing step allows a substantial gain in the precision of the comparison.

In particular embodiments of an aspect of the invention, the step of acquiring data uses an oscilloscope connected to measurement means which are fixed to an injector body and are configured to emit data representing closure instants of an injection nozzle.

Since the oscilloscope is an acquisition means that is not sensitive to thermodynamic factors, the data are acquired reliably In particular embodiments of an aspect of the invention, the step of acquiring data is carried out by data acquisition means which are electrically connected to a strain gauge fixed to the body of the injector and configured to emit data in the form of electrical signals, and are electrically connected to the injector by an electrical connection so as to receive data, in the form of electrical signals, representing instructions emitted by the software solution to the hydroelectric servovalve.

The strain gauge fixed to the injector body and the electrical connection are relatively simple to implement and inexpensive. By ensuring acquisition of data by means external to the injector, these measurement means make it possible to increase the reliability of said acquisition.

In particular embodiments of an aspect of the invention, the comparison step comprises the following substeps:

comparing the data generated by the software solution with those emitted in the form of an electrical signal by the electrical connection of the injector, in order to compare the instants of closure of the injection nozzle which are generated by the software solution with the instants at which the instructions emitted by the monitoring and control component are received by the hydroelectric servovalve, the comparison step being interrupted if the discrepancies between the compared data do not satisfy predetermined criteria, comparing the data emitted in the form of an electrical signal by the strain gauge with those emitted in the form of an electrical signal by the electrical connection on the injector, so that a comparison of these data emitted by the strain gauge with those generated by the software solution is carried out over the same injections, that is to say over the same frame of reference, comparing the data emitted in the form of an electrical signal by the strain gauge with those generated by the software solution so as to identify possible discrepancies between these data, the software solution being considered to be malfunctioning when these discrepancies do not satisfy predefined criteria.

Thus, the first two comparisons of the comparison step make it possible to ensure reliability of the third comparison, given that it is in particular this last comparison which makes it possible to determine malfunction of the software solution.

According to a second aspect, the present invention relates to a device for detecting malfunction of a software solution configured to generate data representing instants of interruption of fuel injection of an internal combustion engine in order to carry out the method mentioned above, comprising measurement means fixed to an injector body and connected to data acquisition means.

BRIEF DESCRIPTION OF THE DRAWINGS

Aspects of the invention will be understood more clearly on reading the following description, which is given by way of entirely nonlimiting example and is provided with reference to the figures, which represent.

DETAILED DESCRIPTION OF THE PREFERRED EMBODIMENTS

An aspect of the present invention relates to a method for monitoring malfunction of a software solution for estimating an instant of interruption of fuel injection of an internal combustion engine. In the present text, when reference is made to fuel injection, this means the injection known as "main injection", giving rise to the creation of an engine torque, and not injections known as "pilot injection and secondary injection", which are generally carried out for the purpose of reducing noise and emissions of polluting particles.

Figure 1:
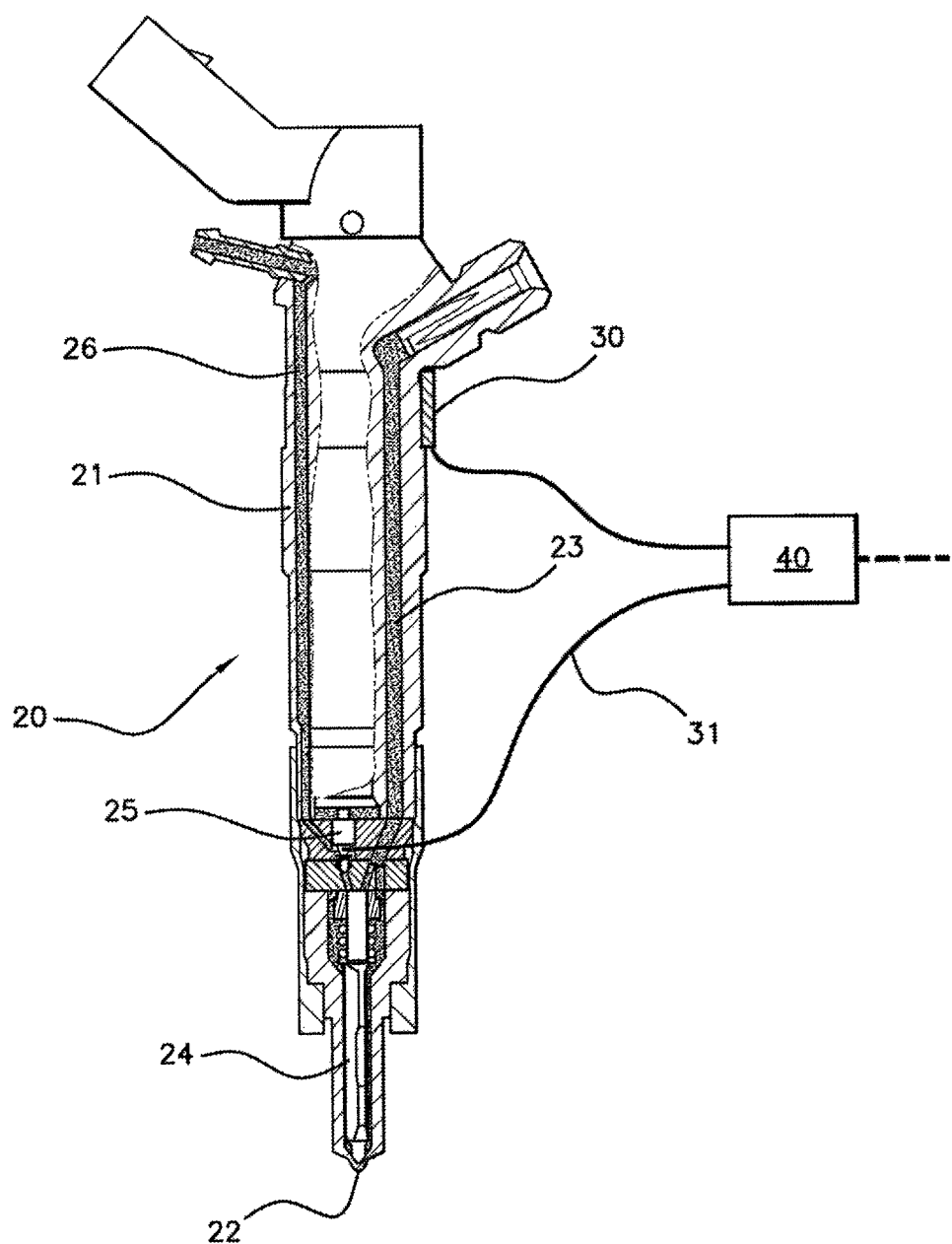
FIG. 1: a schematic representation of an injector used in the method for detecting malfunction of a software solution for estimating the instant of interruption of fuel injection of an internal combustion engine, according to an aspect of the invention.

The monitoring method which is a subject matter of an aspect of the present invention is carried out on an indirectly controlled fuel injector 20 comprising a substantially cylindrical injector body 21 extending between a first and a second end, as represented in a nonlimiting exemplary embodiment by FIG. 1. The first end of the injector body is intended to be arranged at a distance from a combustion chamber of an internal combustion engine, and the second end of the injector body 21 is intended to be arranged inside said combustion chamber.

A main injection channel 23, intended to contain a fuel at high pressure, extends axially from one end of the injector body 21 to the other. The main channel 23 opens substantially at the first end so as to form a fuel supply orifice, and opens at the second end so as to form an injection nozzle 22.

The injection nozzle 22 comprises a sealing seat configured so that said nozzle 22 can be closed in a leaktight fashion by one end, referred to as the "distal end", of a needle 24 arranged so as to move in translation in the body 21 of the injector. The other end of the needle 24, referred to as the "proximal end", opens inside a hydraulic control chamber connected to the main channel 23 and arranged so that fuel at high pressure can apply a force to said proximal end of the needle 24 with a strength such that it holds the needle 24 against the sealing seat, closing the injector nozzle 22. In the rest of the text, when reference is made to closure of the injection nozzle 22, it is to be understood that the closure is total and is carried out in a leaktight fashion.

A hydroelectric servovalve 25 comprising a piezoelectric actuator is arranged in the control chamber so as to be able to generate a fuel leakage flow to a bypass channel 26, the effect of which is to make the pressure locally decrease on the proximal end of the needle. The effect of this local decrease in pressure is to displace the needle 24 by a phenomenon of equilibration of the pressures applied to the needle, and thus to cause injection of fuel into the combustion chamber by releasing the distal end of the needle 24 from the sealing seat of said nozzle 22. The interruption of the fuel injection is carried out by terminating the actuation of the hydraulic servovalve 25, so as to close the bypass channel 26 and thus interrupt the fuel leakage flow in order to increase the hydraulic pressure applied to the proximal end of the needle. The increase in the hydraulic pressure applied to the proximal end of the needle 24 causes displacement of said needle 24 toward the sealing seat so as to close the injection nozzle 22.

The instant at which the injection should be interrupted, and consequently the instant at which the nozzle 22 should be closed, is estimated by a software solution integrated into monitoring and control means of the engine, known as an engine control unit, referred to below as an ECU. The ECU is connected to the hydroelectric servovalve 25 by electrical connection means, so as to be able to operate said hydraulic servovalve 25 by sending electrical pulses.

In the context of an aspect of the present invention, this instant of closure of the nozzle 22 is estimated by the software solution by virtue of a strategy for estimating the instant of closure of the nozzle 22, comprising a step of generating a voltage pulse making it possible to detect a voltage variation of the piezoelectric actuator. This voltage variation corresponds substantially to the instant of closure of the nozzle 22. This is because closure of the nozzle 22 causes a brief hydraulic overpressure in the main channel 23 of the injector, generating a wave propagating through the fuel until it strikes the piezoelectric actuator and generates this voltage variation.

The strategy for estimating the instant of closure of the nozzle 22 may, in particular, take into account the hydraulic and/or mechanical delays between the closure of the nozzle 22 and the voltage variation, such as the propagation time of the wave in the fuel from the nozzle 22 to the piezoelectric actuator.

The software solution is configured in order to generate data representing, in particular, estimates of instants of closure of the injection nozzle 22, and to export these data to ad-hoc data acquisition software developed for this purpose.

Figure 2:
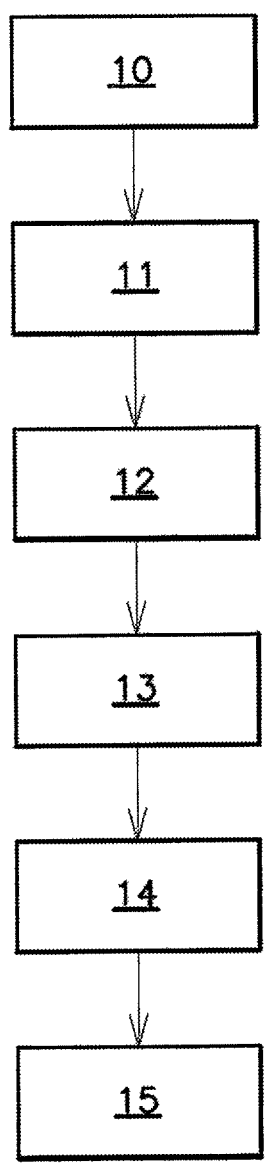
FIG. 2: a flowchart representing successive steps of a method for detecting malfunction of a software solution for estimating the instant of interruption of fuel injection of an internal combustion engine, according to an aspect of the invention.

The method according to an aspect of the present invention for monitoring malfunction of the estimation software, as represented by FIG. 2 in the form of a flowchart, comprises a step of acquiring 11, over a predefined duration, data representing instants of closure of the injection nozzle 22 which are emitted by measurement means. The data are acquired by data acquisition means 40, to which the measurement means are connected.

In one preferred exemplary embodiment of an aspect of the invention, the measurement means are fixed to the body 21 of the injector and comprise a strain gauge 30, as schematically represented by FIG. 1. The strain gauge 30 is preferably fixed to the first end of said body 21, and is thus arranged at a distance from the injection nozzle 22, so that said strain gauge 30 is not disturbed by temperature variations due to the alternation between the phases of combustion of the injected fuel and release of the gases resulting from the combustion. The installation 10 of the strain gauge 30 on the injector may constitute a step preliminary to the step of acquiring data 11.

Upon closure of the nozzle 22 of the injector, the needle 24 returns into contact with the sealing seat of said nozzle 22, causing a mechanical impact. The strain gauge 30 is sensitive to the vibrations due to this mechanical impact, and is capable of emitting data in the form of an electrical signal, said electrical signal being representative, in particular, of the contact between the needle 24 and the sealing seat of the nozzle 22, and therefore of the instant of closure of the injection nozzle 22. By processing this electrical signal, it is then possible to determine the instant at which the nozzle 22 is closed.

In order to process this electrical signal, the strain gauge 30 is connected in a manner known to the person skilled in the art to data acquisition means 40, as schematically represented by FIG. 1 in an exemplary embodiment. The data acquisition means 40 comprise, for example, an electronic amplifier configured to adapt the electrical signals generated by the strain gauge 30 so as to optimize their processing by the data acquisition means. The data acquisition means comprise an oscilloscope. An oscilloscope has, in particular, the advantage of not being sensitive to thermodynamic factors.

The acquisition of the electrical signal emitted by the strain gauge 30 is carried out, for example, with predefined fixed parameters, such as a certain rotational speed of the internal combustion engine, or a certain pressure in the combustion chamber.

In addition, as schematically represented by FIG. 1, the measurement means also comprise an electrical connection 31 formed on the injector by a splice onto the electrical connection of the injector, and more particularly onto the means for electrical connection 31 of the ECU to the hydroelectric servovalve 25. The splice makes it possible to electrically connect the hydroelectric servovalve 25 to the data acquisition means 40, so as to visualize the value of the voltage across the terminals of the hydroelectric servovalve 25. This value of the voltage across the terminals of the hydroelectric servovalve 25 is representative of the instructions emitted by the software solution, and therefore makes it possible to obtain a reliable representation of the instructions emitted by the ECU to the hydroelectric servovalve 25. Advantageously, the hydroelectric servovalve 25 is connected by means of the splice to the same oscilloscope as that which carries out the acquisition of the data emitted by the strain gauges 30.

The acquisition by the oscilloscope of the data emitted, in the form of an electrical signal, by the strain gauge 30 and by the splice, and the estimation of the data generated by the software solution, are carried out in parallel with one another, at each injection. In order to allow them to be processed during subsequent steps, a step of recording 12 these data is carried out.

Since the needle 24 of the injector is subjected to vibratory phenomena that may interfere with the measurement means upon release of the nozzle 22, the launch of the strategy for detecting the instant of closure of the nozzle 22 of the software solution is carried out after a predefined delay has elapsed after the start of the recording, and likewise the activation of the data acquisition means 40.

Figure 4:
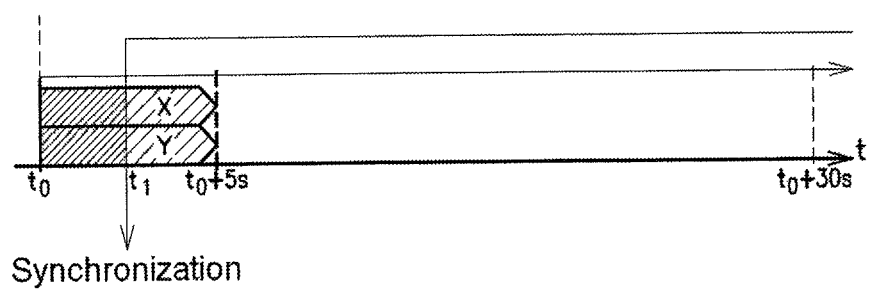
FIG. 4: a schematic representation of the moment of synchronization of the data after recording.

The recording of the data is carried out for a predefined duration that is sufficient to generate a significant number of injections, and thus to allow processing of these data. The duration of the recording is, for example, five seconds. In FIG. 4, the start of the recording is represented by the reference to.

Subsequently, a step of synchronizing 14 the data generated by the software solution and the data emitted by the measurement means is carried out. More precisely, the data acquired by the oscilloscope, which are represented by the reference X in FIG. 4, are synchronized with the data generated by the software solution, represented by the reference Y in FIG. 4, starting from the launch of the detection strategy which is represented by the reference ti in said figure. This is because the voltage pulse generated by the strategy for detecting the instant of closure of the nozzle 22 of the injector makes it possible to determine the moment at which the detection strategy was activated by the software solution.

The data representing the estimation of instants of closure of the injection nozzle 22, which are generated by the software solution, with data representing the instant of closure of the injection nozzle 22, which are emitted by the measurement means, may subsequently be windowed by ad-hoc software, in order to isolate the moments representing the instants of closure of the injection nozzle 22, during a windowing step 13.

The method for detecting malfunction of a software solution for estimating the instant of interruption of injection comprises a step of comparing 15 the data representing the estimation of instants of closure of the injection nozzle 22, which are generated by the software solution, with data representing the instant of closure of injection nozzle 22 which are emitted by the measurement means.

Preferably, the step of comparing 15 the data representing the estimation by the software solution of instants of closure of the injection nozzle 22 with data emitted by measurement means comprises a first comparison of the data generated by the software solution with those emitted by means of the splice on the injector. More precisely the data representing the estimation of instants of closure of the injection nozzle 22, which, are generated by the software solution, are compared with the data representing the instant of reception of the instructions to close the nozzle 22 which are emitted by the ECU to the hydroelectric servovalve 25, for example, for each injection carried out over the predefined data acquisition duration. In order to carry out this comparison step 15, the data emitted by means of the splice on the injector, which are acquired by the oscilloscope, are exported and processed by suitable processing software, the development of which is within the capability of the person skilled in the art and does not form the subject matter of an aspect of the present invention application.

Figure 3:
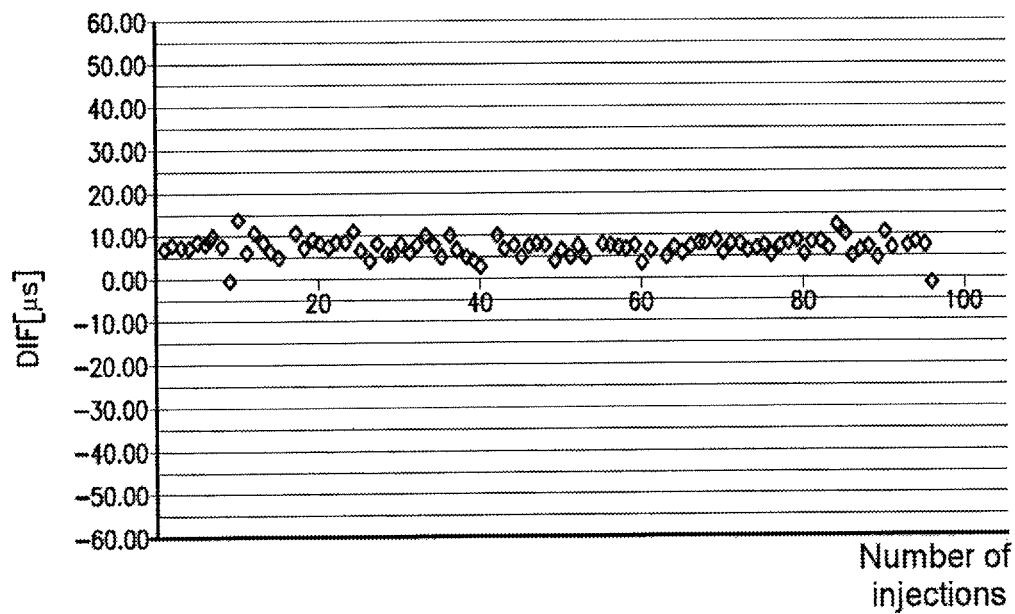
FIG. 3: a graphical representation comprising a cluster of points of a data comparison carried out by dedicated software.

In a nonlimiting exemplary embodiment, FIG. 3 represents a graph comprising a cluster of points resulting from this comparison, the cluster being obtained using said processing software, each point representing one injection. For each injection of a cycle of a certain number of injections, it is thus possible to determine the value of the discrepancies between the instants of closure of the nozzle 22 which are generated by the software solution and the instants of reception of the instructions emitted by the ECU to the hydroelectric servovalve 25, which are read on the ordinate axis in FIG. 3 in microseconds under the reference DIF.

The values of the discrepancies resulting from these comparisons must be substantially identical during a given cycle of a plurality of injections in order to ensure reliability of the method. "Substantially identical" means that the values of these discrepancies should have a maximum standard deviation with a value, for example, of from two to three microseconds.

If the values of the discrepancies between the compared data do not satisfy predefined criteria, such as a predetermined maximum standard deviation value, the comparison step is interrupted.

Subsequent to the first comparison, if the compared data satisfy the predefined criteria, a second comparison is carried out between the data generated by the strain gauge 30 and the data generated by the software solution.

It should be noted that the processing software is configured to form a graph resulting from this comparison, of the same type as that described above, following this comparison step in order to be able to process the results of this comparison.

In one exemplary embodiment, a reference point is determined, by means of the processing software, on the electrical signal emitted by the strain gauge in order to represent the instant of closure of the nozzle 22. This reference point is selected arbitrarily and is intended to be identical for each electrical signal acquired, i.e. for each injection carried out, in order to have common bases for comparison of the data to each of the injections carried out during a cycle of a certain number of injections during the recording duration. The data emitted by the strain gauge 30 and the data emitted by the electrical connection on the injector are exported to software configured in order to carry out a comparison of said data for a given injection.

The comparison of the data coming from the splice and those coming from the strain gauge 30 is carried out after post-processing by means of software which makes it possible to find, injection by injection, the instants of closure of the injection nozzle 22 coming from the two acquisitions, once windowed. Since the hydroelectric servovalve 25 is connected to the same oscilloscope as that which carries out the acquisition of the data emitted by the strain gauge 30, the comparison of the data is relatively simple and rapid and is carried out on one and the same base.

The value of the discrepancies between the data generated by the software solution and the data acquired by the oscilloscope, for each injection, are extracted by the processing software so that they can be processed by means of a graph resulting from this comparison, of the same type as that represented in FIG. 3. Constant discrepancy values characterize the robustness of the software solution. The software solution for estimating instants of closure of the injection nozzle 22 is considered to be malfunctioning, that is to say not robust, when the range of the values of the discrepancies for a given number of injections is greater than a threshold value. When the software solution is considered to be malfunctioning, the software requires improvement or correction. By way of nonlimiting example, the threshold value is more than ten microseconds.

More generally, it should be noted that the embodiments considered above have been described as nonlimiting examples, and that other variants may consequently be envisioned.

The invention claimed is:

1. A method for detecting a malfunction of a software solution executed by an electronic control unit (ECU) of a vehicle for monitoring and controlling an internal combustion engine of the vehicle, the solution being configured to generate data representing the instant of interruption of fuel injection of a hydroelectric servovalve of an injector of the internal combustion engine of the vehicle, the method comprising:

acquiring data by data acquisition means including a voltage detector which is connected to a measurement means including a sensor fixed to an injector body of the injector of the internal combustion engine of the vehicle and configured to emit data representing closure instants of an injection nozzle of the injector of the internal combustion engine of the vehicle, recording, by a processor, the data generated by the software solution of the ECU and the data emitted by the measurement means, over a predetermined duration, synchronizing, by the processor, the data generated by the software solution of the ECU and the data emitted by the measurement means, comparing, by the processor, the synchronized data generated by the software solution and the data emitted by the measurement means, so as to identify discrepancies between these data, and determining, by the processor, that the software solution of the ECU is malfunctioning when the disscrepancies between the compared data do not satisfy predefined criteria.

2. The method according to claim 1, wherein one of the predefined criteria is that the value of the range of the values of the discrepancies of the compared data must be less than a threshold value.

3. The method according to claim 1, wherein preliminary to the acquiring the data is installing the measurement means on a body of the injector.

4. The method according to claim 1, wherein a step of windowing the data emitted by the measurement means, in order to isolate the instants of closure of the injection nozzle, is carried out between the steps of synchronization and comparison.

5. The method according to claim 1, wherein the step of acquiring data uses an oscilloscope connected to measurement means which are fixed to an injector body and are configured to emit data representing closure instants of the injection nozzle.

6. The method according to claim 1, wherein the acquiring data is carried out by the data acquisition means which are electrically connected to a strain gauge fixed to the body of the injector and configured to emit data in the form of electrical signals, and are electrically connected to the injector by an electrical connection so as to receive data, in the form of electrical signals, representing instructions emitted by the software solution to the hydroelectric servovalve.

7. The method according to claim 6, wherein the comparison step comprises:

comparing the data generated by the software solution with those emitted in the form of an electrical signal by the electrical connection of the injector, in order to compare the instants of closure of the injection nozzle which are generated by the software solution with the instants at which the instructions emitted by the monitoring and control component are received by the hydroelectric servovalve, the comparison step being interrupted if the discrepancies between the compared data do not satisfy predetermined criteria, comparing the data emitted in the form of an electrical signal by the strain gauge with those emitted in the form of an electrical signal by the electrical connection on the injector, so that a comparison of these data emitted by the strain gauge with those generated by the software solution is carried out over the same injections, and comparing the data emitted in the form of an electrical signal by the strain gauge with those generated by the software solution so as to identify possible discrepancies between these data, the software solution being considered to be malfunctioning when these discrepancies do not satisfy predefined criteria.

8. A device for detecting a malfunction of a software solution configured to generate data representing instants of interruption of fuel injection of an internal combustion engine in order to carry out the method according to claim 1, comprising a measurement means fixed to an injector body and connected to a data acquisition means.

9. The method according to claim 2, wherein preliminary to the acquiring the data is installing the measurement means on the body of the injector.

10. The method according to claim 2, wherein windowing the data emitted by the measurement means, in order to isolate the instants of closure of the injection nozzle, is carried out between the synchronization and the comparison.

11. The method according to claim 3, wherein windowing the data emitted by the measurement means, in order to isolate the instants of closure of the injection nozzle, is carried out between the synchronization and the comparison.

12. The method according to claim 2, wherein the acquiring of the data uses an oscilloscope connected to the measurement means which are fixed to an injector body and are configured to emit data representing closure instants of the injection nozzle.

13. The method according to claim 3, wherein the acquiring of the data uses an oscilloscope connected to the measurement means which are fixed to an injector body and are configured to emit data representing closure instants of the injection nozzle.

14. The method according to claim 4, wherein the acquiring of the data uses an oscilloscope connected to the measurement means which are fixed to an injector body and are configured to emit data representing closure instants of the injection nozzle.

15. The method according to claim 2, wherein the acquiring of the data is carried out by the data acquisition means which are electrically connected to a strain gauge fixed to the body of the injector and configured to emit data in the form of electrical signals, and are electrically connected to the injector by an electrical connection so as to receive data, in the form of electrical signals, representing instructions emitted by the software solution to the hydroelectric servovalve.

16. The method according to claim 3, wherein the acquiring of the data is carried out by the data acquisition means which are electrically connected to a strain gauge fixed to the body of the injector and configured to emit data in the form of electrical signals, and are electrically connected to the injector by an electrical connection so as to receive data, in the form of electrical signals, representing instructions emitted by the software solution to the hydroelectric servovalve.

17. The method according to claim 4, wherein the acquiring of the data is carried out by the data acquisition means which are electrically connected to a strain gauge fixed to the body of the injector and configured to emit data in the form of electrical signals, and are electrically connected to the injector by an electrical connection so as to receive data, in the form of electrical signals, representing instructions emitted by the software solution to the hydroelectric servovalve.

18. A method for detecting a malfunction of a software solution executed by an electronic control unit (ECU) of a vehicle for monitoring and controlling an internal combustion engine of the vehicle, the solution being configured to generate data representing estimated closure instants of an injection nozzle of a hydroelectric servovalve of an injector of the internal combustion engine of the vehicle, the method comprising:

- acquiring data by data acquisition means including a voltage detector which is connected to a measurement means including a sensor fixed to an injector body of the injector of the internal combustion engine of the vehicle and configured to emit data representing sensed closure instants of the injection nozzle sensed by the sensor,
- recording, by a processor, a timing of the estimated closure instants of the injection nozzle generated by the software solution of the ECU and the data emitted by the measurement means representing the sensed closure instants of the injection nozzle sensed by the sensor, over a predetermined duration,
- synchronizing, by the processor, the estimated closure instants generated by the software solution of the ECU and the sensed closure instants emitted by the measurement means,
- comparing, by the processor, the synchronized estimated closure instants and the sensed closure instants, so as to identify discrepancies in timing between the synchronized estimated closure instants and the sensed closure instants, and
- determining, by the processor, that the software solution of the ECU is malfunctioning when the discrepancies in timing between the synchronized estimated closure instants and the sensed closure instants are greater than a threshold.

* * * * *